United States Patent
Chiba et al.

(10) Patent No.: US 10,212,084 B2
(45) Date of Patent: Feb. 19, 2019

(54) COMMUNICATION SYSTEM, CONTROL APPARATUS, COMMUNICATION METHOD, CONTROL METHOD AND PROGRAM

(71) Applicant: NEC CORPORATION, Minato-ku, Tokyo (JP)

(72) Inventors: Yasunobu Chiba, Tokyo (JP); Kazushi Sugyou, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 14/407,434

(22) PCT Filed: Jun. 12, 2013

(86) PCT No.: PCT/JP2013/003673
§ 371 (c)(1),
(2) Date: Dec. 11, 2014

(87) PCT Pub. No.: WO2013/187054
PCT Pub. Date: Dec. 19, 2013

(65) Prior Publication Data
US 2015/0156113 A1 Jun. 4, 2015

(30) Foreign Application Priority Data
Jun. 14, 2012 (JP) ................................. 2012-135031

(51) Int. Cl.
*H04L 12/801* (2013.01)
*H04L 12/721* (2013.01)
(Continued)

(52) U.S. Cl.
CPC ............ *H04L 47/10* (2013.01); *H04L 45/38* (2013.01); *H04L 45/42* (2013.01); *H04L 45/586* (2013.01); *H04L 45/64* (2013.01)

(58) Field of Classification Search
CPC ...................................................... H04L 47/10
See application file for complete search history.

(56) References Cited

U.S. PATENT DOCUMENTS 8,908,539 B1 * 12/2014 Pani .................... H04L 43/0811
370/248
9,001,827 B2 * 4/2015 Appenzeller .......... H04L 45/54
370/392
(Continued)

FOREIGN PATENT DOCUMENTS

| CN | 1852502 A | 10/2006 |
|---|---|---|
| JP | 2005-236881 A | 9/2005 |

(Continued)

OTHER PUBLICATIONS

International Search Report (ISR) (PCT Form PCT/ISA/210), in PCT/JP2013/003673, dated Jul. 16, 2013.
(Continued)

*Primary Examiner* — Hassan Kizou
*Assistant Examiner* — Abdullahi Ahmed
(74) *Attorney, Agent, or Firm* — Finnegan, Henderson, Farabow, Garrett & Dunner, L.L.P.

(57) ABSTRACT

A communication system includes a plurality of control apparatuses that determine a packet handling operation; a plurality of packet processing units that process packets in accordance with the packet handling operation notified by the control apparatus; an assignment unit that assigns, with respect to each of the packet processing unit, a control apparatus that controls the packet processing unit concerned; and a database that is shared by the plurality of control apparatuses and that stores information related to the packet handling operation; wherein each of the control apparatuses refers to the database to determine the packet handling operation.

20 Claims, 19 Drawing Sheets

(51) Int. Cl.
  *H04L 12/713*  (2013.01)
  *H04L 12/715*  (2013.01)
  *H04L 12/717*  (2013.01)

(56) References Cited

U.S. PATENT DOCUMENTS

| | | | |
|---|---|---|---|
| 2006/0209900 A1* | 9/2006 | Sekaran | H04L 67/10 370/503 |
| 2006/0212597 A1* | 9/2006 | Shimada | H04L 67/1008 709/238 |
| 2011/0235508 A1* | 9/2011 | Goel | H04L 47/125 370/230 |
| 2012/0250496 A1 | 10/2012 | Kato | |
| 2013/0070762 A1* | 3/2013 | Adams | H04L 49/70 370/389 |
| 2013/0230047 A1* | 9/2013 | Subrahmaniam | H04L 47/2441 370/392 |
| 2013/0258847 A1* | 10/2013 | Zhang | H04L 47/22 370/232 |

FOREIGN PATENT DOCUMENTS

| | | |
|---|---|---|
| JP | 2009-213097 A | 9/2009 |
| JP | 2010-045503 A | 2/2010 |
| JP | 4559512 62 | 10/2010 |
| JP | 2012-080516 A | 4/2012 |
| WO | WO 2008/095010 A | 8/2008 |
| WO | WO 2011/065268 A | 6/2011 |

OTHER PUBLICATIONS

Rob Sherwood, et al.: "FlowVisor: A Network Virtualization Layer", [Online], [search conducted May 28, 2012], Internet: <URL: http://www.openflow.org/downloads/technicalreports/openflow-tr-2009-1-flowvisor.pdf>, pp. 1-14.
Korean Office Action dated Jul. 21, 2015 with a Japanese and an English translation.
Koponen, Teemu, et al. "Onix: A Distributed Control Platform for Large-Scale Production Networks." OSDI. vol. 10 (2010). (14 pages).
Extended European Search Report dated Dec. 23, 2015.
"OpenFlow Switch Specification", Dec. 5, 2011 (Dec. 5, 2011) XP055177510, Retrieved from the Internet: URL:https://www.opennetworking.org/images/stories/downloads/sdn-resources/onf-specifications/openflow/openflow-spec-v1.2.pdf.
Chinese Office Action dated Sep. 18, 2016, by the Chinese Patent Office in counterpart Chinese Patent Application No. 201380030383.0.
(First) Office Action issued by the European Patent Office in counterpart European Patent Application No. 13 803 867.4, dated Apr. 11, 2017.
Craig Ellrod, "Load Balancing—Least Connections | Citrix Blogs", Sep. 2, 2010 (Sep. 2, 2010), pp. 1-8 XP055361738, Retrieved from the Internet: URL: https://www.citrix.com/blogs/201 0/09/02/load-balancing-leastconnections/ [retrieved on Apr. 4, 2017].

* cited by examiner

FIG. 4

| MATCHING RULE | PROCESSING METHOD |
|---|---|
| COMMUNICATION FLOW #A | FORWARD PACKET FROM PORT a |
| COMMUNICATION FLOW #B | FORWARD PACKET FROM PORT b |
| . . . | |

FIG. 7

| CONTROL APPARATUS ID | LOAD | ASSIGNED PACKET PROCESSING UNIT |
|---|---|---|
| CONTROL APPARATUS 1-1 | 40% | 3-1, 3-2 |
| CONTROL APPARATUS 1-2 | 60% | 3-3, 3-4, 3-5 |
| ... | ... | ... |
| CONTROL APPARATUS 1-n | 20% | ... |

| CONTROL APPARATUS ID | DISTANCE FROM PACKET PROCESSING UNIT | | |
| --- | --- | --- | --- |
| | PACKET PROCESSING UNIT 3-1: DISTANCE A | . . . | PACKET PROCESSING UNIT 3-n: DISTANCE X |
| CONTROL APPARATUS 1-1 | | | |
| . . . | | | |

FIG. 8

| CONTROL APPARATUS ID | COMMUNICATION COST WITH PACKET PROCESSING UNIT | | |
|---|---|---|---|
| | PACKET PROCESSING UNIT 3-1: COST A | ... | PACKET PROCESSING UNIT 3-n: COST X |
| CONTROL APPARATUS 1-1 | | | |
| ... | | | |

FIG. 9

COMMUNICATION SYSTEM, CONTROL APPARATUS, COMMUNICATION METHOD, CONTROL METHOD AND PROGRAM

CROSS-REFERENCE TO RELATED APPLICATIONS

The present invention is based upon and claims the benefit of priority of Japanese Patent Application No. 2012-135031, filed on Jun. 14, 2012, the disclosure of which is incorporated herein in its entirety by reference thereto.

TECHNICAL FIELD

The present invention relates to a communication system, a control apparatus, a communication method, a control method and program, and relates to a communication system, a control apparatus, a communication method, a control method and program that process packets in accordance with control by the control apparatus.

BACKGROUND

In recent years, technology has been proposed by which a computer performs centralized control of packet forwarding by communication equipment such as a switch or router.

Patent Literature (PTL) 1 discloses technology in which switches in a communication system process packets in accordance with an instruction notified by a control apparatus. The control apparatus performs centralized control of a plurality of switches in the communication system.

Non Patent Literature (NPL) 1 discloses technology in which a plurality of control apparatuses share control of a plurality of switches in a communication system.
[PTL 1]
International Publication No. 2008/095010

Non Patent Literature

[NPL 1]
Rob Sherwood and 6 others: "FlowVisor: A Network Virtualization Layer", [Online], [search conducted May 28, 2012], Internet: <URL: http://www.openflow.org/downloads/technicalreports/openflow-tr-2009-1-flowvisor.pdf>

SUMMARY

The disclosures of the patent literature and non patent literature given above are hereby incorporated in their entirety by reference into this specification. When a control apparatus performs centralized control of a plurality of communication equipment (switches, routers, or the like) as in Patent Literature 1, there may be an increase in load on the control apparatus. A load increase on the control apparatus may cause a deterioration in performance in a communication system.

Non Patent Literature 1 discloses sharing control of communication equipment by a plurality of control apparatuses, but there is no disclosure concerning a configuration that facilitates operation management of a plurality of control apparatuses, with regard to avoiding control apparatus failure and the like.

According to a first aspect of the present invention, there is provided a communication system comprising: a plurality of control apparatuses that determine a packet handling operation (packet processing rule); a plurality of packet processing units that process a packet in accordance with the packet handling operation notified by the control apparatus; an assignment unit that assigns, with respect to each of the plurality of packet processing unit, a control apparatus that controls the packet processing unit concerned; and a database that is shared by the plurality of control apparatuses and that stores information related to the packet handling operation; wherein each of the control apparatuses refers to the database to determine the packet handling operation.

According to a second aspect of the present invention, there is provided a control apparatus, which controls packet processing, comprising: a first unit that refers to a database shared by the control apparatus and another control apparatus, and determines a packet handling operation related to a processing method for the packet; and a second unit that notifies the determined packet handling operation to, among a plurality of packet processing units, a packet processing unit assigned to the control apparatus.

According to a third aspect of the present invention, there is provided a communication method, by which a plurality of control apparatuses control packet processing, comprising: assigning, to each of a plurality of packet processing units, a control apparatus that controls the packet processing unit concerned; determining, by each of the control apparatuses, a packet handling operation for processing a packet, by referring to a database shared by the plurality of control apparatuses; and notifying, by each of the control apparatuses, the determined packet handling operation to the assigned packet processing unit.

According to a fourth aspect of the present invention, there is provided a control method, for a control apparatus that controls processing of a packet, comprising: determining a packet handling operation related to a method of processing the packet, by referring to a database shared by the control apparatus and another control apparatus; and notifying the determined packet handling operation to, among a plurality of packet processing units, a packet processing unit assigned to the control apparatus.

According to a fifth aspect of the present invention, there is provided a program that executes, in a control apparatus that controls processing of a packet, a process of determining a packet handling operation related to a method of processing the packet, by referring to a database shared by the control apparatus and another control apparatus; and a process of notifying the determined packet handling operation to, among a plurality of packet processing units, a packet processing unit assigned to the control apparatus. This program can be recorded in a computer-readable storage medium which may be non-transitory. That is, the present disclosure may be embodied as a computer program product.

The meritorious effects of the present invention are summarized as follows.

The present invention contributes to distribution of load on a control apparatus and of facilitating operation management of a plurality of control apparatuses.

BRIEF DESCRIPTION OF THE DRAWINGS

FIG. 4 is a diagram showing an example of a database referred to by a control apparatus.

FIG. 7 is a diagram showing an example of a database possessed by the assignment unit.

FIG. 8 is a diagram showing an example of the database possessed by the assignment unit.

FIG. 9 is a diagram showing an example of the database possessed by the assignment unit.

PREFERRED MODES

First Exemplary Embodiment

Figure 1:
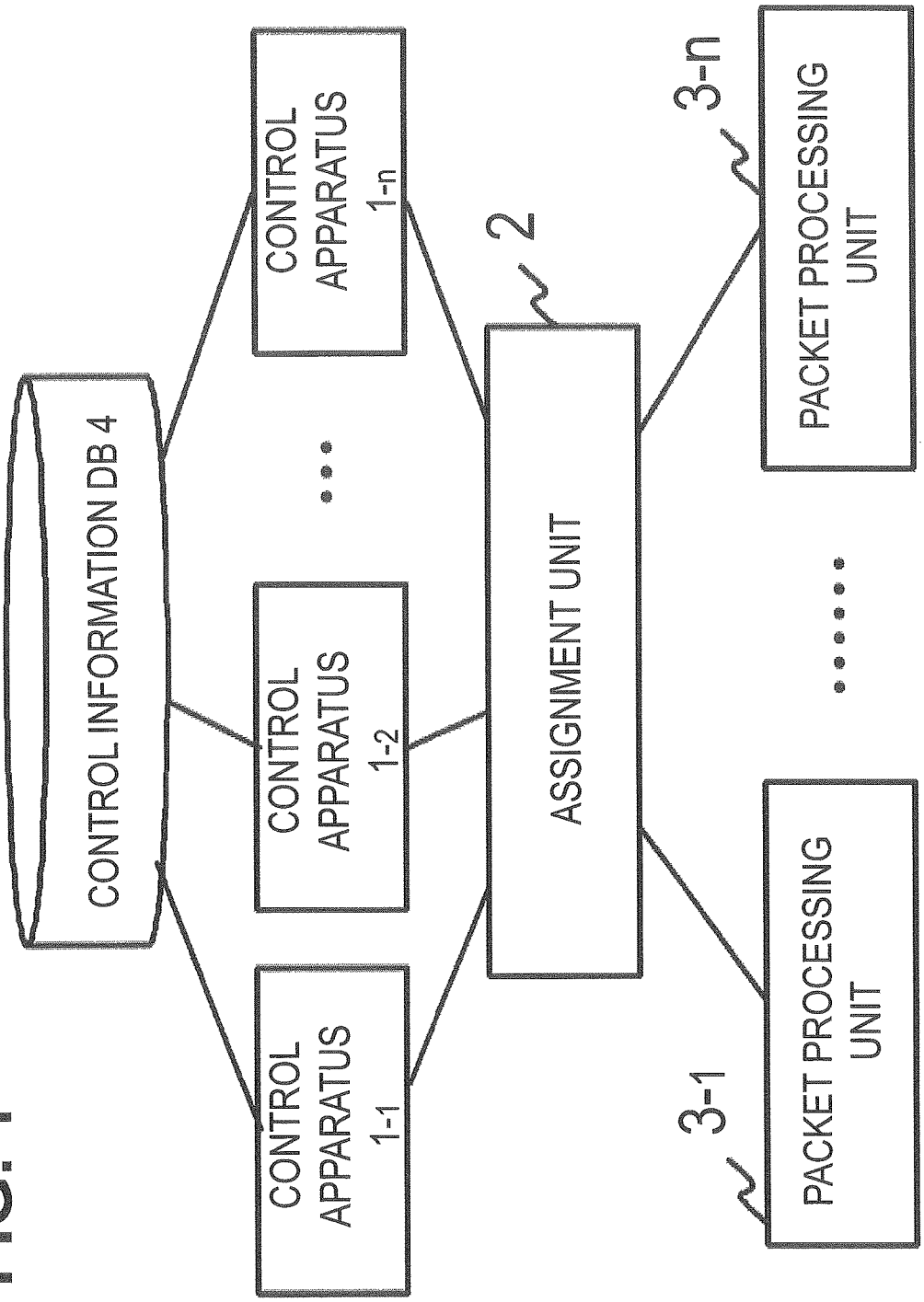
FIG. 1 is a diagram showing an example of a system configuration of a first exemplary embodiment.

FIG. 1 shows a configuration example of a communication system of a first exemplary embodiment. FIG. 1 is an example, and the configuration of the communication system of the present disclosure is not limited to FIG. 1.

The communication system includes a plurality of control apparatuses 1, an assignment unit 2, a plurality of packet processing units 3, and a control information DB (Database) 4. The respective control apparatuses 1 share the control information DB 4, and refer to the control information DB 4 to control the packet processing units 3. Since the respective control apparatuses 1 share the database, the respective control apparatuses 1 need not store control information for controlling the packet processing units. Accordingly, in a case of switching a packet processing unit that is a target for control, or a case of replacing a control apparatus 1 in which a failure has occurred, the respective control apparatuses 1 need not execute processing such as handing over control information among the control apparatuses, and operation management of the control apparatuses is facilitated.

The respective packet processing units 3 process packets in accordance with a packet handling operation (i.e. packet processing rule) notified by a control apparatus 1. For example, a packet processing unit 3 executes processing such as packet forwarding, packet header rewriting, and packet dropping, in accordance with a packet handling operation notified by the control apparatus 1. It is to be noted that the packet processing unit 3 is, for example, communication equipment such as a switch, a router, or the like. In the packet processing unit 3, functionality equivalent to communication equipment such as a switch, a router, or the like may be configured by software (virtual switch).

Figure 2:
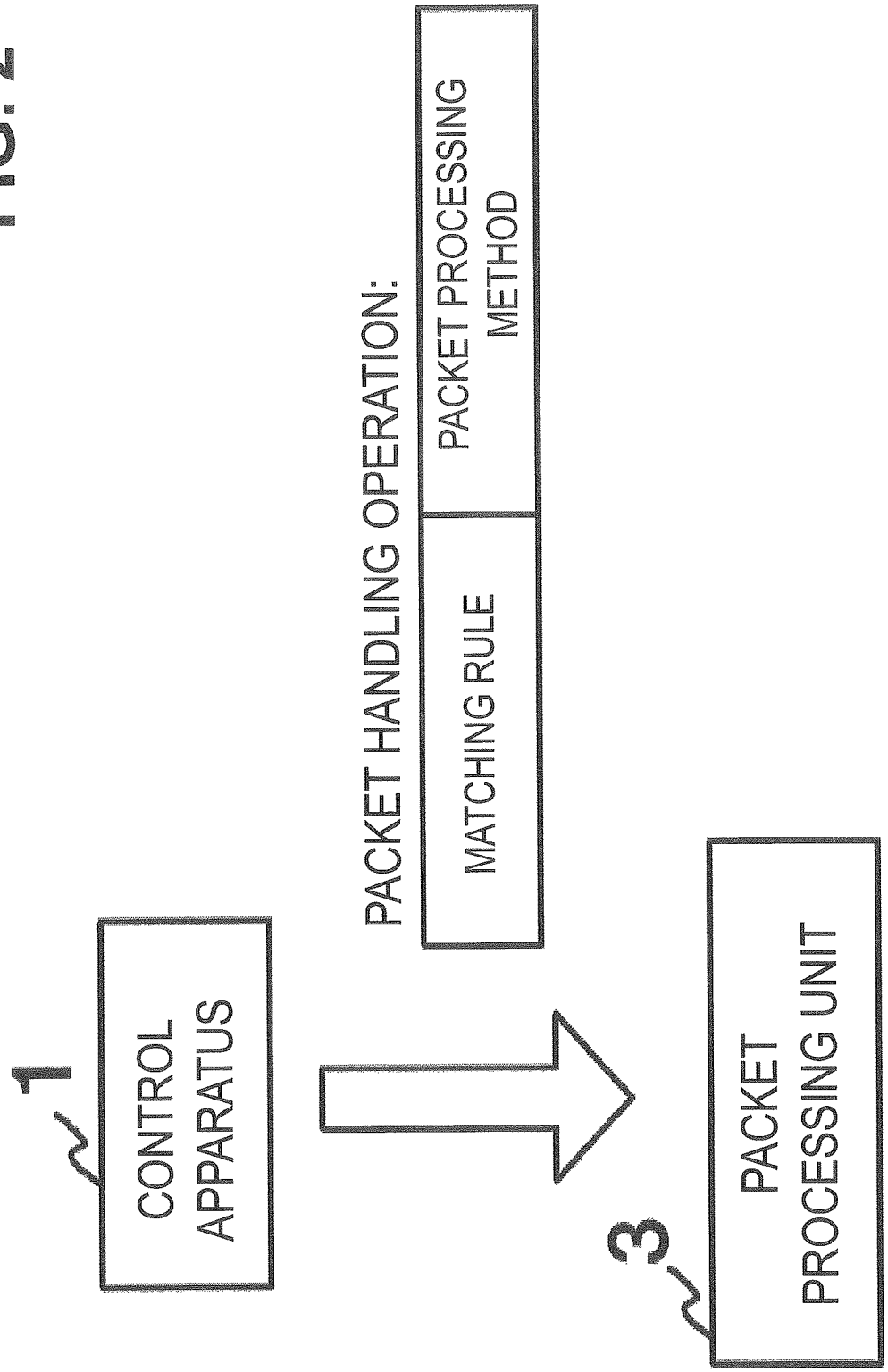
FIG. 2 is a diagram showing an operational example of the first exemplary embodiment.

FIG. 2 shows an example of a packet handling operation notified by the control apparatus 1 to the packet processing unit 3.

Furthermore the control apparatus 1, for example, transmits to the packet processing unit a packet handling operation including a packet processing method and a condition (matching rule) for identifying a packet that is a target of the processing method. The matching rule, for example, is a rule identified based on information included in the packet, such as a packet to be transmitted to a prescribed destination or a packet transmitted from a prescribed transmission source.

The packet processing unit 3 processes a packet conforming with a matching rule in accordance with a processing method corresponding to the matching rule.

Figure 3:
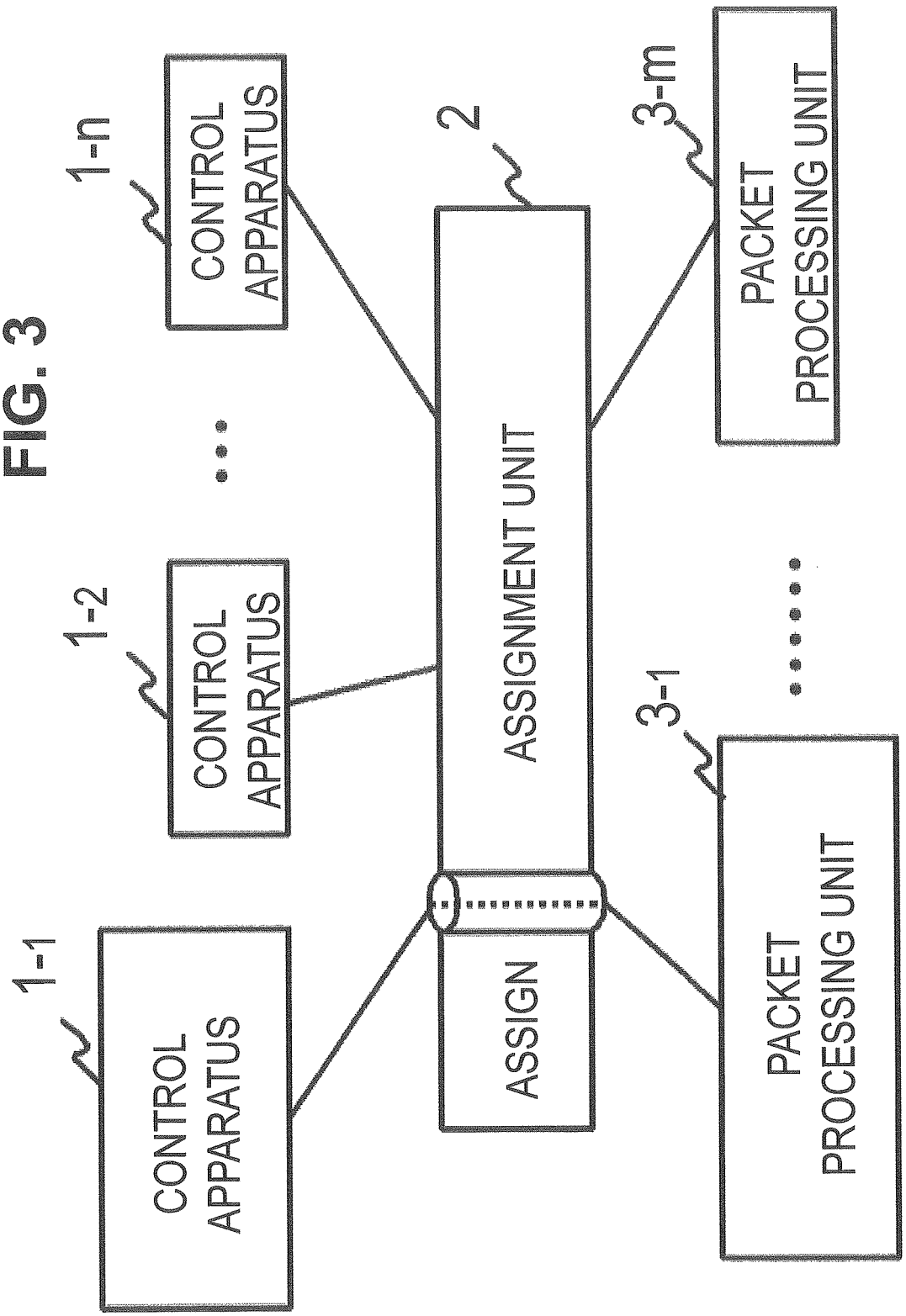
FIG. 3 is a diagram showing an operational example of the first exemplary embodiment.

The assignment unit 2 assigns, with regard to each of the packet processing units 3, a control apparatus 1 that controls a relevant packet processing unit 3. The assignment unit 2, for example, assigns the control apparatus 1-1 to the packet processing unit 3-1, as in the example of FIG. 3. It is to be noted that the assignment unit 2 manages the control apparatuses 1 and the packet processing units 3 present in the system.

It is to be noted that the assignment unit 2 may determine a control apparatus 1 to be assigned to a packet processing unit 3 every time a packet handling operation enquiry is transmitted from the packet processing unit 3. Furthermore, the assignment unit 2 may determine a packet processing unit 3 corresponding to a control apparatus 1 that has transmitted a packet handling operation every time the control apparatus 1 transmits the packet handling operation to the packet processing unit. That is, the assignment unit 2 may assign the control apparatuses to the respective packet processing units 3 at an arbitrary trigger.

The assignment unit 2 may select a plurality of packet processing units 3 corresponding to a control apparatus 1.

The packet processing units 3 process packets in accordance with an instruction notified by the control apparatus 1 assigned by the assignment unit 2. That is, the control apparatus 1 may control only the packet processing unit 3 assigned by the assignment unit 2. It is to be noted that the assignment unit 2 may assign a plurality of the packet processing units 3 to the control apparatus 1.

The assignment unit 2, for example, assigns a corresponding control apparatus 1 to the respective packet processing units 3, based on identification information (for example, IP address, Datapath ID, or the like) of the packet processing units 3. The assignment unit 2, for example, assigns control apparatuses 1 so that load is distributed among each of the control apparatuses 1. For example, the assignment unit 2 allocates the control apparatuses 1 to the packet processing units 3, in a round robin manner.

The control information DB 4 manages information related to packet handling operations notified to the assigned packet processing units 3 by the respective control apparatuses 1. It is to be noted that the control information DB 4 is configured by a plurality of databases, and the plurality of databases may be shared by the respective control apparatuses 1. By the configuration of a plurality of databases, the control information DB 4 has redundancy.

FIG. 4 shows an example of information stored by the control information DB 4. FIG. 4 is an example, and the information stored by the control information DB 4 is not limited to FIG. 4. The control information DB 4, for example, manages candidate packet handling operations to be notified to the packet processing units 3. Furthermore, the control information DB 4, for example, may manage information (control policy or the like) used for generating a packet handling operation by a control apparatus 1.

In the example of FIG. 4, the control information DB 4 manages candidate packet handling operations to be notified to the packet processing units 3. The respective packet handling operations, for example, include a matching rule and a processing method. The packet processing units 3 process packets in accordance with a processing method specified in the packet handling operation. The packet processing unit 3 compares a matching rule and a received packet. In a case where the received packet matches the matching rule, the packet processing unit 3 processes the received packet by a processing method corresponding to the matching rule. The matching rule, for example, is a condition for identifying a packet as a communication flow. A communication flow is a sequence of packets identified by a prescribed condition. The matching rule, for example, is a rule identified based on information included in a packet, such as a packet to be transmitted to a prescribed destination or a packet transmitted from a prescribed transmission source.

The respective control apparatuses 1 refer to the control information DB 4 to determine a packet handling operation to be notified to the assigned packet processing unit 3. The respective control apparatuses 1 may update content of the control information DB 4.

Figure 5:
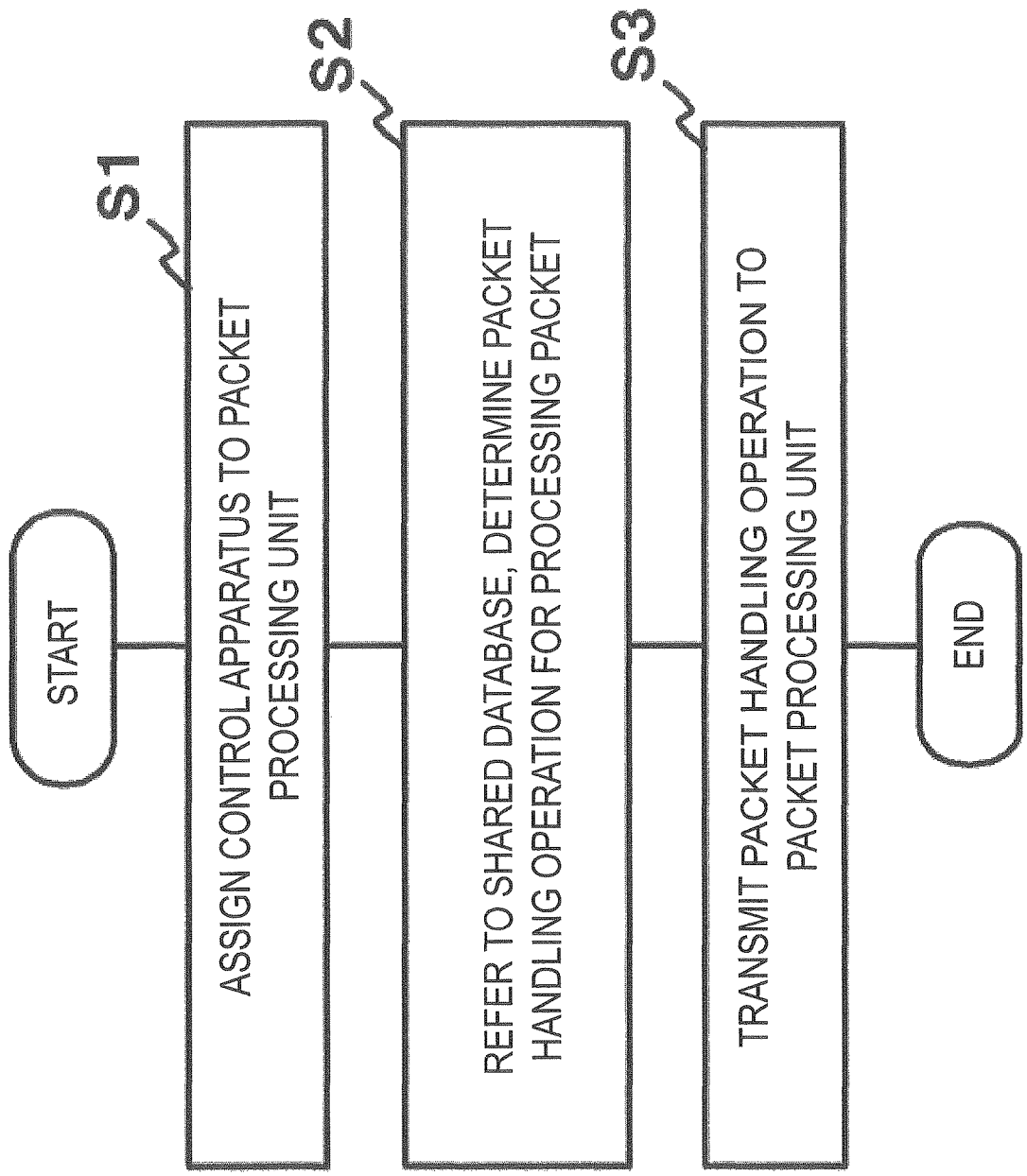
FIG. 5 is a flowchart showing an operational example of the first exemplary embodiment.

FIG. 5 is a flowchart showing an operational example of the first exemplary embodiment.

The assignment unit 2 assigns a control apparatus 1 to a packet processing unit 3 (S1).

The control apparatus 1 refers to the control information DB 4 shared by the plurality of control apparatuses to determine a packet handling operation for notification to an assigned packet processing unit 3 (S2).

The control apparatus 1 transmits a determined packet handling operation to the packet processing unit 3 (S3). The packet processing unit 3 processes a packet in accordance with the packet handling operation notified by the assigned control apparatus 1.

Since there is a distribution in the number of packet processing units 3 that the respective control apparatuses 1 are in charge of, the load on the control apparatuses 1 is distributed.

In a case where a failure occurs in a control apparatus 1, another control apparatus 1, for example, operates in place of the control apparatus 1 in which the failure has occurred. In this case, this control apparatus 1 can operate in place of the control apparatus 1 in which the failure has occurred by only referring to the shared control information DB 4, and the control apparatus 1 need not consider an operation such as handing over information from the control apparatus 1 in which the failure has occurred. Accordingly, in the present exemplary embodiment, a system failure can be easily avoided.

Second Exemplary Embodiment

A configuration example of a communication system in a second exemplary embodiment is similar to FIG. 1.

Figure 6:
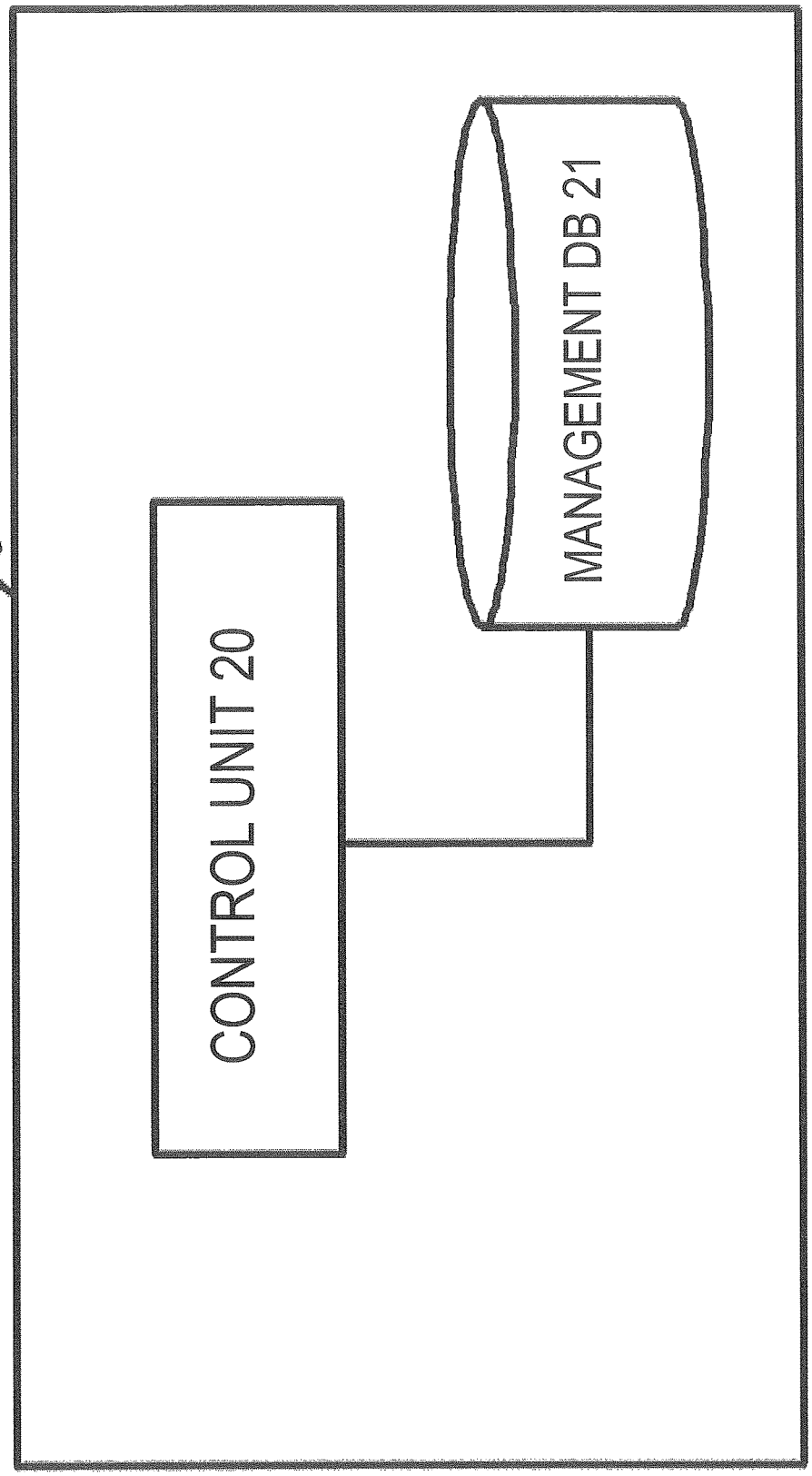
FIG. 6 is a diagram showing an example of a configuration of an assignment unit.

FIG. 6 shows a configuration example of an assignment unit 2 with regard to the second exemplary embodiment. In the second exemplary embodiment, a description is given of an operational example in which the assignment unit 2 assigns a control apparatus 1 to a packet processing unit 3.

The assignment unit 2 includes a control unit 20 and a management DB (Database) 21.

The control unit 20 refers to the management DB 21 to determine the control apparatus 1 to be assigned to the packet processing unit 3.

FIG. 7 shows an example of a database possessed by the management DB 21. A configuration of the database possessed by the management DB 21 is not limited to FIG. 7.

The management DB 21, for each control apparatus 1, for example, manages load on the control apparatus 1, and the packet processing unit 3 assigned to the control apparatus 1. The control unit 20 gives consideration to the load of each of the control apparatuses 1, to assign a control apparatus 1 to a packet processing unit 3. The control unit 20, for example, assigns a control apparatus 1 with the lowest load to a packet processing unit 3. It is to be noted that the management DB 21 may manage an operation status of each control apparatus (for example, status indicating that a control apparatus is operating or is stopped).

The control unit 20, for example, refers to the management DB 21 at communication system startup or when a new packet processing unit 3 is added to the communication system, and performs assignment of the control apparatus 1. When a new control apparatus 1 is added to the communication system, the control unit 20 may change the assignment of the control apparatuses 1 with respect to the packet processing units 3, for the entire communication system.

The control unit 20 may refer to the management DB 21 to monitor the load situation of each control apparatus 1, and dynamically change the assignment of the control apparatuses 1 with respect to the packet processing units 3. The control unit 20, for example, dynamically changes the assignment for the packet processing units 3, so that the load on the respective control apparatuses 1 approaches the average load of the control apparatuses 1 of the entire system. For example, in a case where the load on a certain control apparatus 1 becomes higher than the average load of the respective control apparatuses by at least a prescribed threshold, the control unit 20 changes the assignment of the packet processing units 3. Furthermore, for example, in a case where the load on a certain control apparatus 1 becomes lower than the average load of the respective control apparatuses by at least a prescribed threshold, the control unit 20 changes the assignment of the packet processing units 3.

The assignment unit 2 may assign the control apparatuses based on information related to the position of the packet processing units 3.

The assignment unit 2 may refer to the distance between a control apparatus 1 and a packet processing unit 3, for example, as information related to position, to perform the assignment of the control apparatuses 1. As shown in an example of FIG. 8, the management DB 21 manages information related to the distance between the control apparatuses 1 and the packet processing units 3. The management DB 21, for example manages the distances to the respective packet processing units 3 included in the communication system, with respect to each control apparatus 1. It is to be noted that the assignment unit 2 may consider the load state exemplified in FIG. 7 and distances exemplified in FIG. 8, to perform assignment of the control apparatuses 1.

The distance between the control apparatus 1 and the packet processing unit 3, for example, is a distance depending on position relationships of the control apparatus and the packet processing unit, or a distance determined based on network configuration (network topology) of the communication system. The distance between the control apparatus 1 and the packet processing unit 3 may also be the number of communication hops.

The control unit 20, for example, may assign to a packet processing unit a control apparatus whose distance from the packet processing unit 3 is a minimum, among control apparatuses 1 that are candidates for being assigned to the packet processing unit 3.

The assignment unit 2 may refer to communication cost between the control apparatus 1 and the packet processing unit 3, as information related to position, to perform assignment of the control apparatus 1. The management DB 21 manages information related to the communication cost between the control apparatus 1 and the packet processing unit 3, as in the example of FIG. 9. The management DB 21, for example, manages communication cost with regard to the respective packet processing units 3 included in the communication system, with respect to each control apparatus 1. It is to be noted that the assignment unit 2 may consider the load state exemplified in FIG. 7 and communication costs exemplified in FIG. 9, to perform assignment of the control apparatuses 1.

The communication cost, for example, is obtained from round trip time between the control apparatus 1 and the packet processing unit 3, or the number of communication hops between the control apparatus 1 and the packet processing unit 3.

The control unit 20, for example, assigns to a packet processing unit a control apparatus for which communication cost with regard to the packet processing unit 3 is a minimum, among the control apparatuses 1 that are candidates for being assigned to the packet processing unit 3.

Since the assignment unit 2 gives consideration to load in assigning the control apparatus, the load on each control apparatus for controlling the packet processing unit is distributed. Furthermore, since the control apparatus is assigned based on the position of the packet processing unit, communication throughput between the packet processing unit and the control apparatus is improved.

Third Exemplary Embodiment

Figure 10:
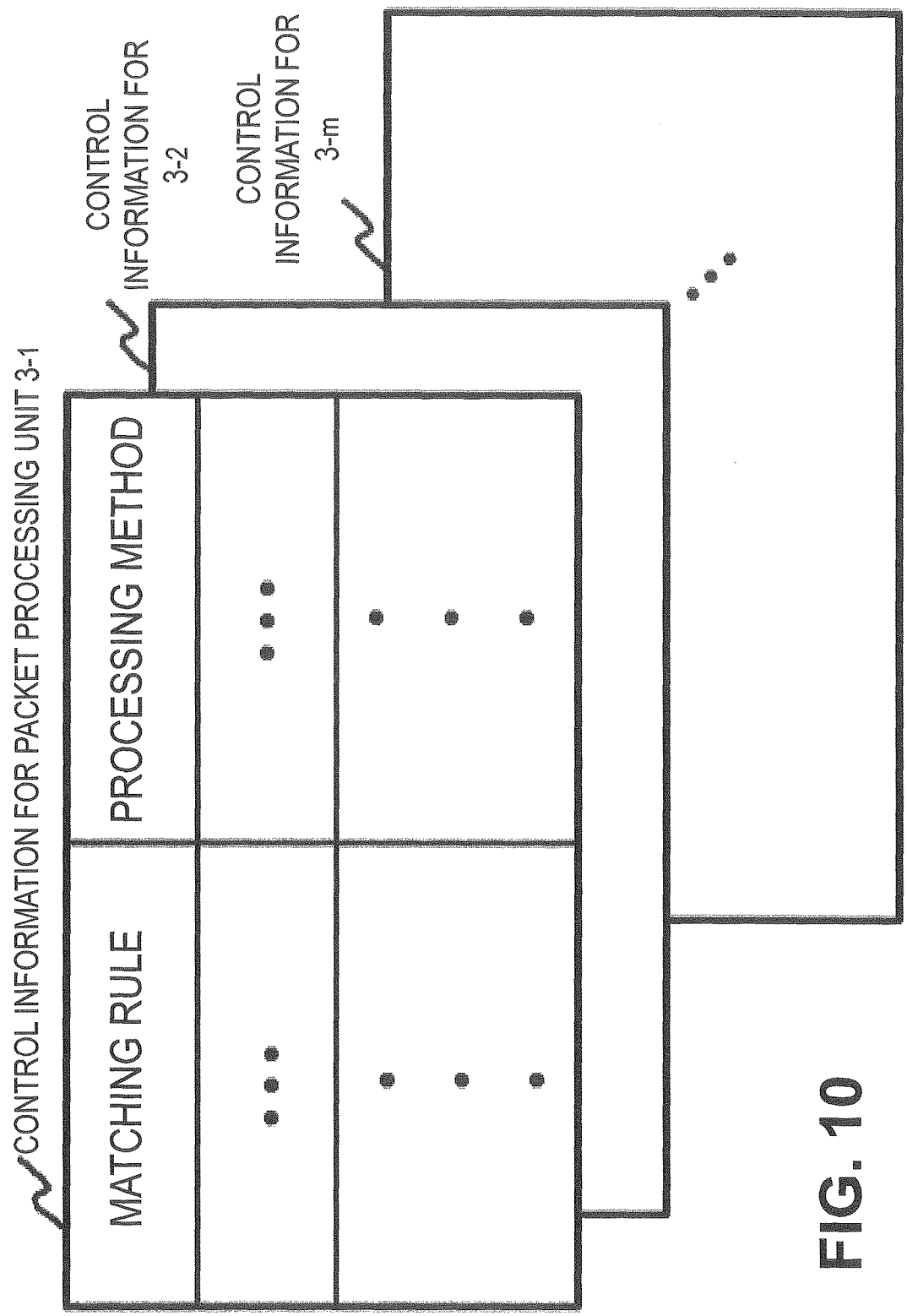
FIG. 10 is a diagram showing an example of the database referred to by the control apparatus.

FIG. 10 shows a configuration example of a control information database DB 4.

The control information DB 4, for example, manages control information for each packet processing unit 3, as shown in FIG. 10.

Respective control apparatuses 1 refer to a region corresponding to an assigned packet processing unit 3 to determine a packet handling operation to be notified to the packet processing unit 3. The respective control apparatuses 1 may update information of the region corresponding to the assigned packet processing unit 3.

In a case where notification of a packet handling operation is requested by the packet processing unit 3 for example, the control apparatus 1 refers to the control information DB 4 to determine the packet handling operation. The control apparatus 1, for example, may periodically refer to the control information DB 4, and in a case where a packet handling operation that should be notified to the packet processing unit 3 is confirmed, may give notification of the packet handling operation to the packet processing unit 3. The control apparatus 1 may refer to the control information DB 4, in response to receiving a control message indicating a database update from the control information DB 4.

Figure 11:
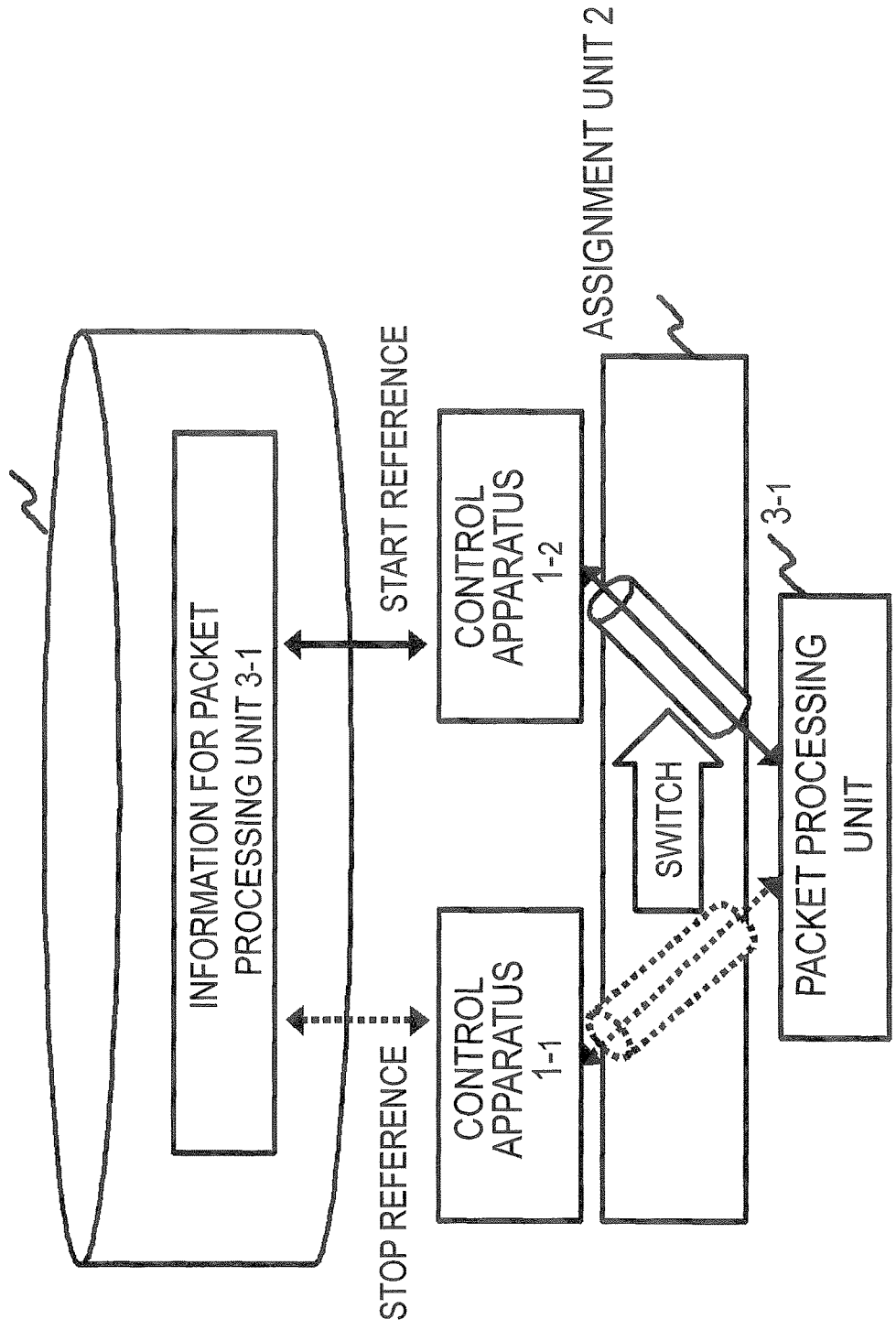
FIG. 11 is a diagram showing an operational example of a third exemplary embodiment.

FIG. 11 shows an operational example in a case where a control apparatus 1 assigned to a certain packet processing unit 3 is switched. FIG. 11 shows an example where the control apparatus assigned to the packet processing unit 3-1 is switched from the control apparatus 1-1 to the control apparatus 1-2.

In a case where a failure occurs in the control apparatus 1 for example, the assignment unit 2 determines a control apparatus 1 to control the packet processing unit 3 in place of the control apparatus in which the failure has occurred. The assignment unit 2 switches the control apparatus 1 in which the failure has occurred to the determined control apparatus 1.

The control apparatus 1-1 stops referring to control information for the packet processing unit 3-1. The control apparatus 1-2 that is newly in charge of controlling the packet processing unit 3-1 starts making reference to control information for the packet processing unit 3-1, and takes over control of the packet processing unit 3-1. It is to be noted that since the control apparatuses 1-1 and 1-2 share the control information DB 4, the control apparatus 1-2 need not execute processing relating to taking over control, between itself and the control apparatus 1-1.

Figure 12:
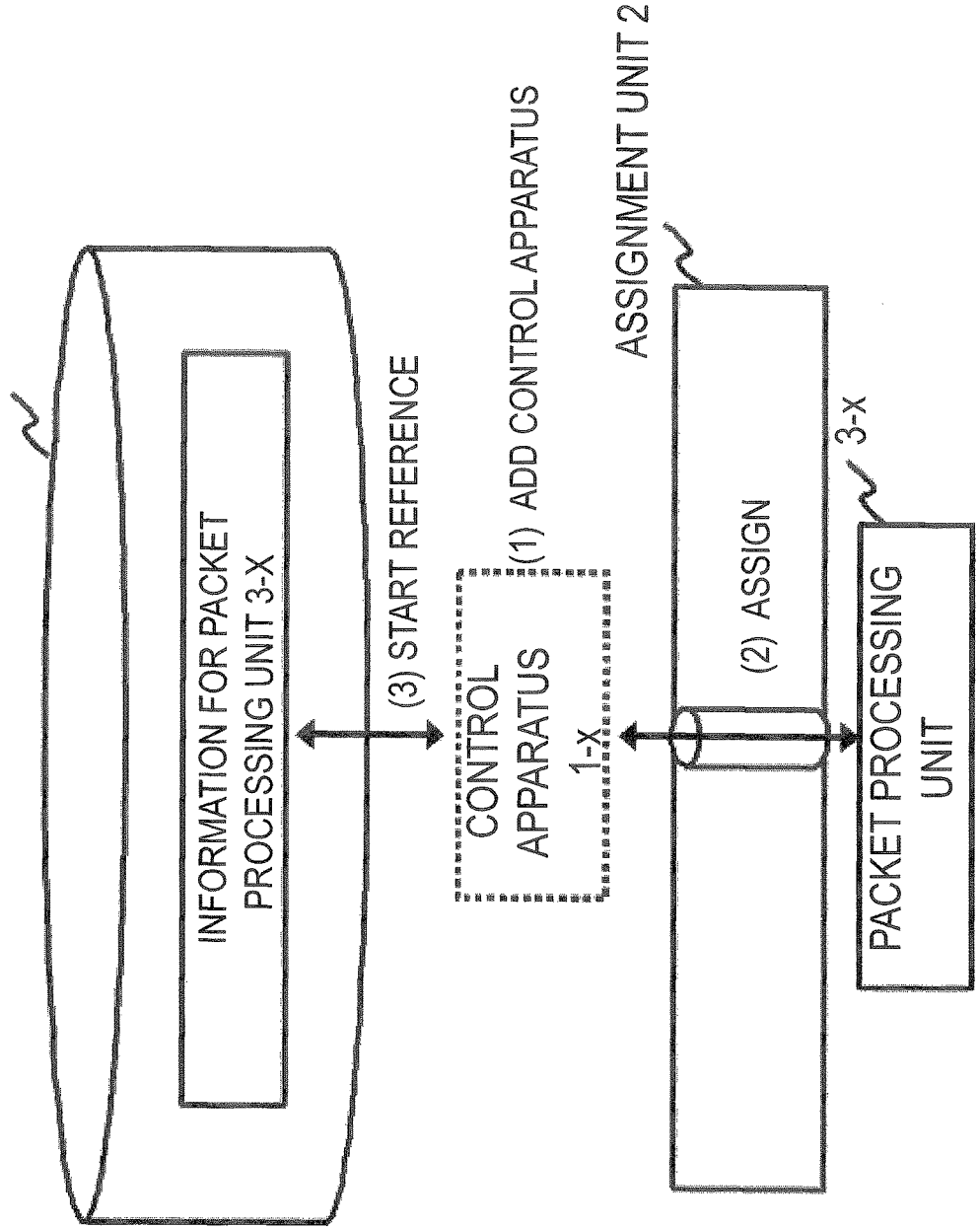
FIG. 12 is a diagram showing an operational example of the third exemplary embodiment.

FIG. 12 shows an operational example in a case where a control apparatus 1 is newly added to a system. FIG. 12 shows an example where a control apparatus 1-x is added to the system.

The assignment unit 2 assigns a packet processing unit 3-x to the added control apparatus 1-x. The control apparatus 1-x refers to control information for the packet processing unit 3-x, and controls the packet processing unit 3-x.

By the respective control apparatuses sharing the control information DB 4, as in the third exemplary embodiment, scale-out by adding control apparatuses and avoidance of failure are facilitated. This is because by simply referring to the shared database, a control apparatus can start controlling a packet processing unit 3. In a case where a control apparatus 1 performs centralized control of a plurality of packet processing units 3, increasing the number of control apparatuses 1 can be considered in order to inhibit load increase on the control apparatus 1. According to the third exemplary embodiment, a system manager can very easily increase the control apparatuses 1. In a case of switching a control apparatus in order to avoid a failure, it is possible to switch the control apparatus by only changing a database reference, and the system manager can very easily switch a control apparatus.

Since the respective control apparatuses 1 do not individually hold control information, a change to an assignment of a packet processing unit 3 is also easy. In a case where assignment of a packet processing unit 3 is changed, the control apparatus 1 need only change a reference for the control information DB 4. In a case where the respective control apparatuses 1 individually hold control information, movement of control information is necessary when an assignment change is made. However, by having a configuration in which the respective control apparatuses 1 share the control information DB 4, processing to move the control information need not be executed.

Fourth Exemplary Embodiment

A fourth exemplary embodiment illustrates an example in which the present disclosure is implemented by improving technology known as OpenFlow that has a centralized control architecture.

Figure 13:
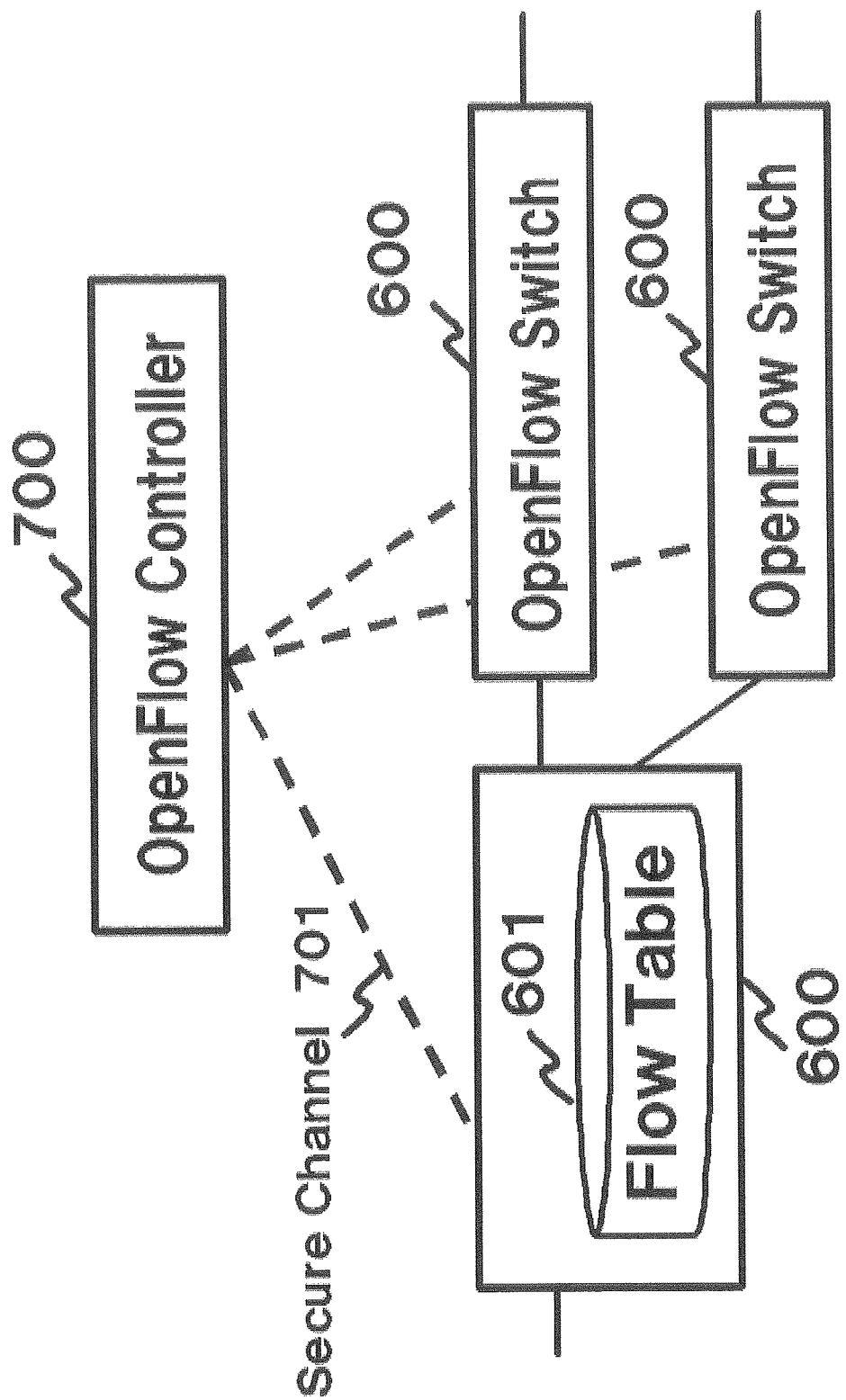
FIG. 13 is a diagram describing technology related to a fourth exemplary embodiment.
Figure 14:
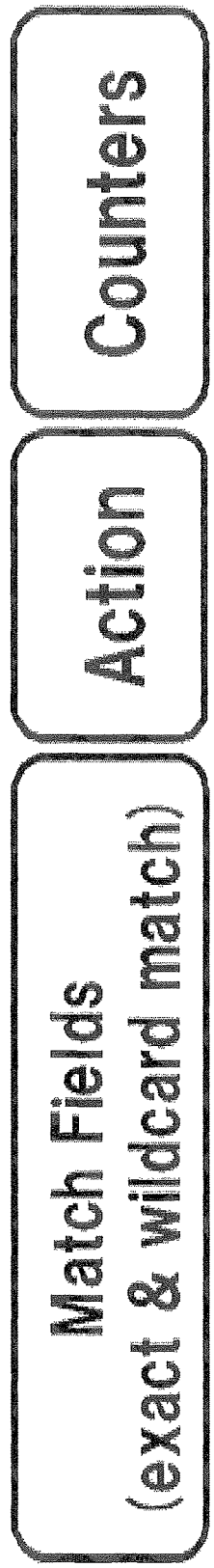
FIG. 14 is a diagram describing technology related to the fourth exemplary embodiment.

A description is given concerning OpenFlow, making reference to FIG. 13 and FIG. 14.

In OpenFlow, communication is recognized as end-to-end flow, and path control, recovery from failure, and load balancing are performed on a flow unit basis. FIG. 13 shows an outline of a communication system configured according to OpenFlow. It is to be noted that a flow, for example, indicates a sequence of communication packet groups having a prescribed attribute. An OpenFlow switch 600 is a network switch that uses OpenFlow technology. An OpenFlow controller 700 is an information processing device that controls the OpenFlow switches 600.

The OpenFlow switch 600 communicates with the OpenFlow controller via a secure channel 701 configured between the OpenFlow switch 600 and the OpenFlow controller 700. The OpenFlow controller 700 configures a flow table 601 of the OpenFlow switch 600 via the secure channel 701. It is to be noted that the secure channel 701 is a communication path adopted in order to prevent bugging or manipulation of communication between the switch and controller.

FIG. 14 shows a configuration example of respective entries (flow entries) of the flow table 601. A flow entry is composed of a matching rule for matching information (for example, destination IP address or VLAN ID) of a packet received by a switch, flow statistical information (Counters) that is statistical information for each packet flow, and actions (Actions) defining a processing method of a packet matching the matching rule.

On receiving a packet, the OpenFlow switch 600 refers to the flow table 601. The OpenFlow switch 600 searches for a flow entry that matches header information of the received packet. In a case where an entry matching the header information of the received packet is retrieved, the OpenFlow switch 600 processes the received packet in accordance with a processing method defined in an action field of the retrieved entry. The processing method has definitions of, for example, "forward the received packet from a prescribed port", "drop the received packet", "rewrite a part of the header of the received packet and forward from a prescribed port".

On the other hand, in a case where an entry matching the header information of the received packet is not found, the OpenFlow switch 600, for example, forwards the received packet to the OpenFlow controller 700 via the secure channel 701. By forwarding the received packet, the OpenFlow switch 600 requests configuration of a flow entry defining a processing method for the received packet, with respect to the controller. It is to be noted that in a case where the received packet matches an entry specifying requesting configuration of a flow entry with respect to the OpenFlow controller 700, the OpenFlow switch 600 may request configuration of the flow entry with respect to the OpenFlow controller 700.

The OpenFlow controller 700 determines a processing method for the received packet, and configures a flow entry including the determined processing method in the flow table 601. Thereafter, the OpenFlow switch 600 processes subsequent packets belonging to the same flow as the received packet in accordance with the configured flow entry.

Figure 15:
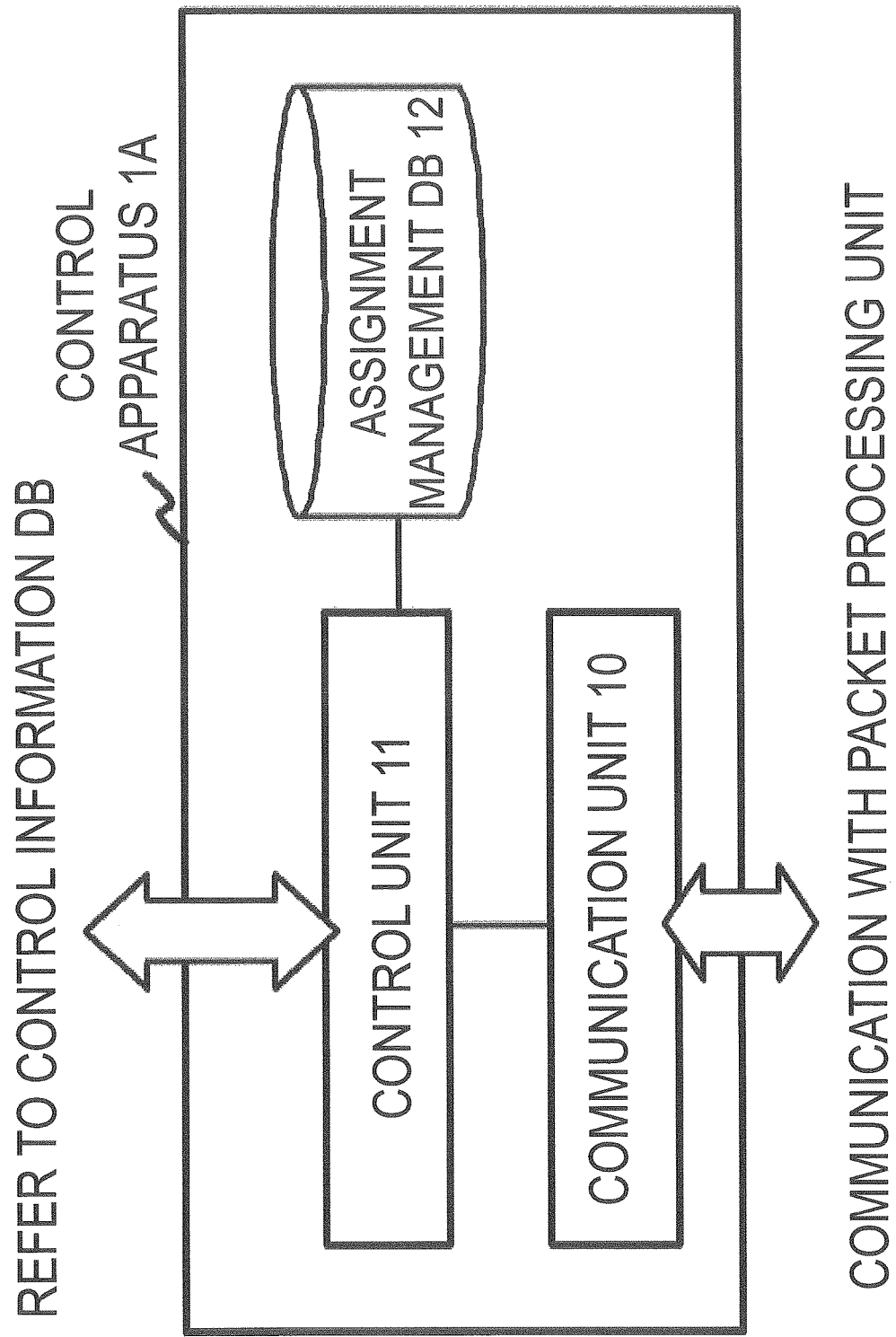
FIG. 15 is a diagram showing an example of a configuration of a control apparatus in the fourth exemplary embodiment.
Figure 16:
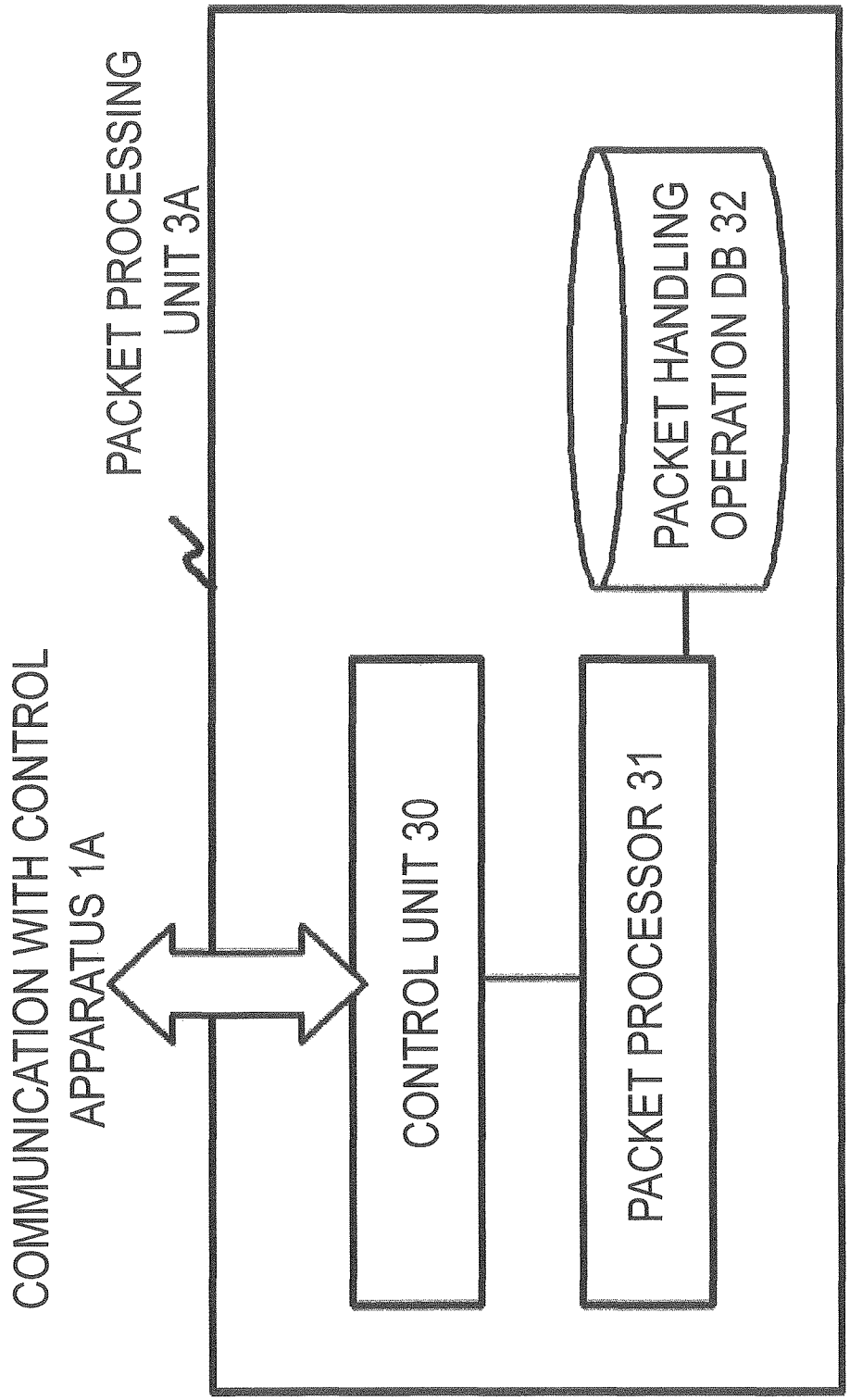
FIG. 16 is a diagram showing an example of a configuration of a packet processing unit in the fourth exemplary embodiment.

System configuration of the fourth exemplary embodiment is similar to the first, second or third exemplary embodiment. FIG. 15 and FIG. 16 respectively show configuration examples of a control apparatus 1A and a packet processing unit 3A of the fourth exemplary embodiment. The control apparatus of FIG. 15 has a configuration whereby a control information DB 4 is shared with another control apparatus, as in the third exemplary embodiment.

FIG. 15 shows a configuration example of the control apparatus 1A of the fourth exemplary embodiment. The control apparatus 1A includes a communication unit 10, a control unit 11, and an assignment management DB 12.

The communication unit 10 communicates with a packet processing unit 3A assigned to the control apparatus 1A. The communication unit 10 gives notification of a packet handling operation to the packet processing unit 3A. The communication unit 10 receives a request for transmission of the packet handling operation from the packet processing unit 3A. The communication unit 10 communicates with the packet processing unit 3A via a control channel established with the packet processing unit 3A.

The assignment management DB 12 manages the packet processing unit 3A assigned to the control apparatus 1A. For example, the assignment management DB 12 manages identification information of the packet processing unit assigned to the control apparatus 1A.

The control unit 11 refers to the assignment management DB 12 and recognizes the packet processing unit 3A assigned to the control apparatus 1A. The control unit 11 refers to control information related to the packet processing unit 3A assigned to the control apparatus 1A, from the control information DB 4. The control unit 11 determines a packet handling operation to be notified to the packet processing unit 3A based on the control information referred to. The control unit 11, for example, determines the packet handling operation in response to a request from the packet processing unit 3A. The control unit 11, for example, may refer to the control information DB 4 autonomously and give notification of the packet handling operation to the packet processing unit 3A.

FIG. 16 shows a configuration example of the packet processing unit 3A of the fourth exemplary embodiment. The packet processing unit 3A includes a communication unit 30, a packet processor 31, and a packet handling operation DB 32.

On receiving a packet, the packet processor 31 searches for a packet handling operation corresponding to the received packet, from the packet handling operation DB 32. The packet processor 31 compares a matching rule of the packet handling operation and header information of the received packet, for example, and searches for a packet handling operation having a matching rule that matches the packet.

The packet processor 31 processes packets in accordance with a processing method specified in the packet handling operation corresponding to the received packet.

In a case where no packet handling operation corresponding to the received packet exists, or where a retrieved packet handling operation directs an enquiry to the control apparatus, for example, the packet processor 31 makes an enquiry for a packet handling operation corresponding to the received packet, with respect to the control apparatus.

The assignment unit 2 forwards the enquiry received from the packet processing unit 3A to the control apparatus 1A assigned to the packet processing unit 3A. The assignment unit 2, for example, has a database that manages the control apparatus 1A assigned to the packet processing unit 3A. The assignment unit 2, for example, has a database that manages identification information and communication address (for example, IP address) of the control information assigned to the packet processing unit 3A.

Figure 17:
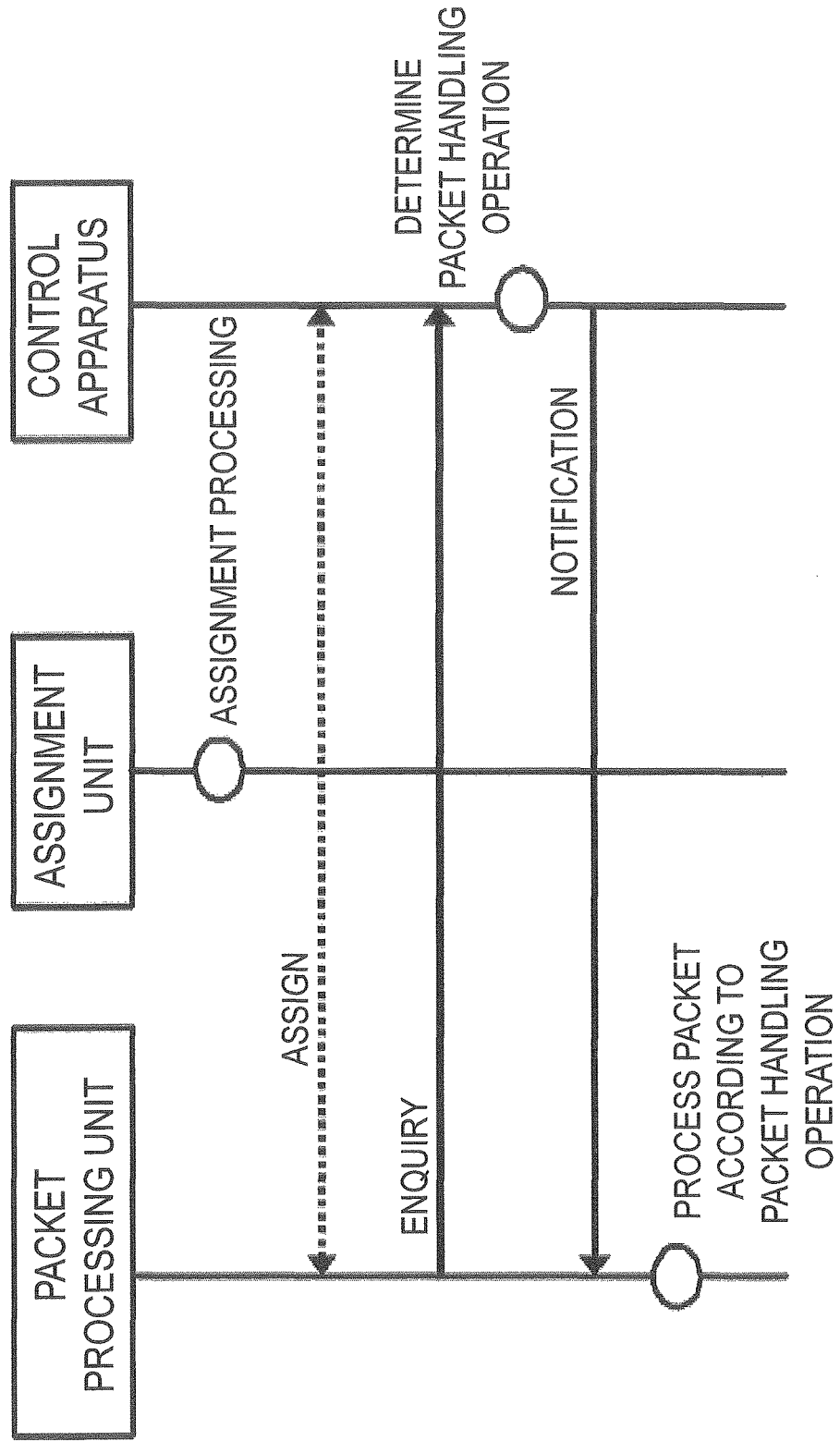
FIG. 17 is a sequence diagram showing an operational example of the fourth exemplary embodiment.

FIG. 17 is a sequence diagram showing an operational example of the fourth exemplary embodiment. FIG. 17 is an example, and operations of the fourth exemplary embodiment are not limited to FIG. 17.

The assignment unit 2 assigns the control apparatus 1A to the packet processing unit 3A. The assignment unit 2, for example, determines the control apparatus 1A assigned to the packet processing unit 3A, based on a method illustrated in the second exemplary embodiment.

The packet processing unit 3A makes an enquiry regarding a packet handling operation corresponding to a received packet, with respect to the assigned control apparatus 1A.

The control apparatus 1A that receives the enquiry determines a packet handling operation and gives notification of the determined packet handling operation to the packet processing unit 3A.

The packet processing unit 3A processes the packet in accordance with the notified packet handling operation.

According to the fourth exemplary embodiment, it is possible to implement the present invention by using Open-Flow technology.

Fifth Exemplary Embodiment

Figure 18:
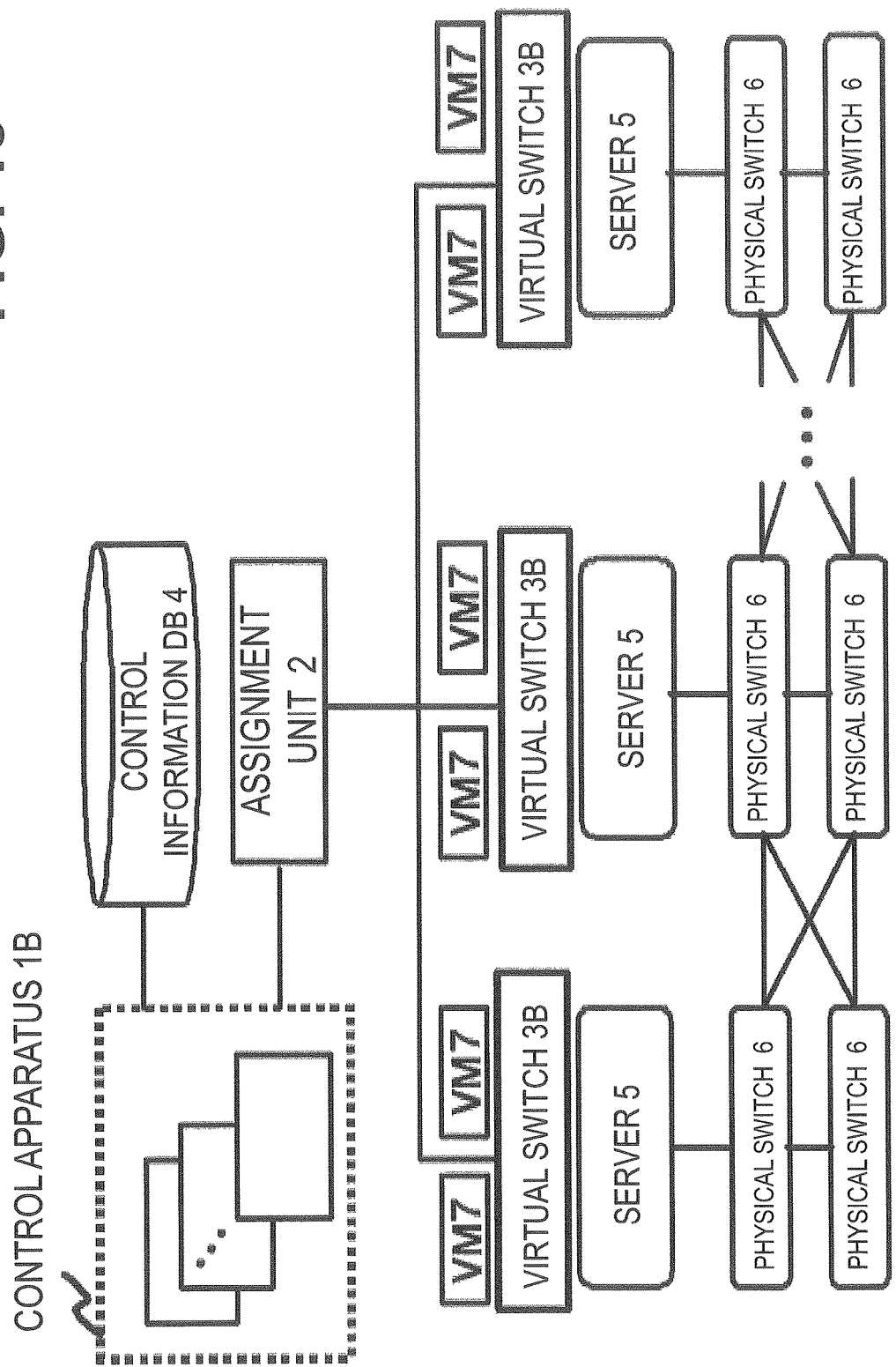
FIG. 18 is a diagram showing an example of a system configuration of a fifth exemplary embodiment.

FIG. 18 shows an example of a system configuration of a fifth exemplary embodiment.

The system of the fifth exemplary embodiment includes a plurality of control apparatuses 1B, an assignment unit 2, a virtual switch (vSwitch) 3B, a server 5, a physical switch 6, and a virtual machine (VM) 7.

The virtual switch 3B is a network switch configured by software run by the server 5. The virtual switch 3B has a function corresponding to a packet processing unit 3 of the other exemplary embodiments. That is, the virtual switch 3B processes packets based on control by a control apparatus 1B. It is to be noted that the virtual switch 3B is positioned, for example, at an edge of a network configured by the physical switches 6.

The plurality of control apparatuses 1B share a control information DB 4.

The virtual machine (VM) 7, which is a computer configured by software, is run on the server 5. The virtual machine 7 communicates with another virtual machine 7 via the virtual switch 3B.

The assignment unit 2 assigns the control apparatus 1B to the respective virtual switches 3B. The virtual switches 3B process a packet in accordance with a packet handling operation notified by the assigned control apparatus 1B.

The server 5 is positioned at an edge of the network configured by the physical switches 6, for example. In this case, the control apparatus 1B controls operation of the virtual switch 3B present at the edge of the network.

The virtual machine 7 communicates with another virtual machine 7 via the virtual network built on the physical switches 6. The virtual network, for example, is built based on a protocol such as a VLAN (Virtual LAN) or NVGRE (Network Virtualization using Generic Routing Encapsulation).

Figure 19:
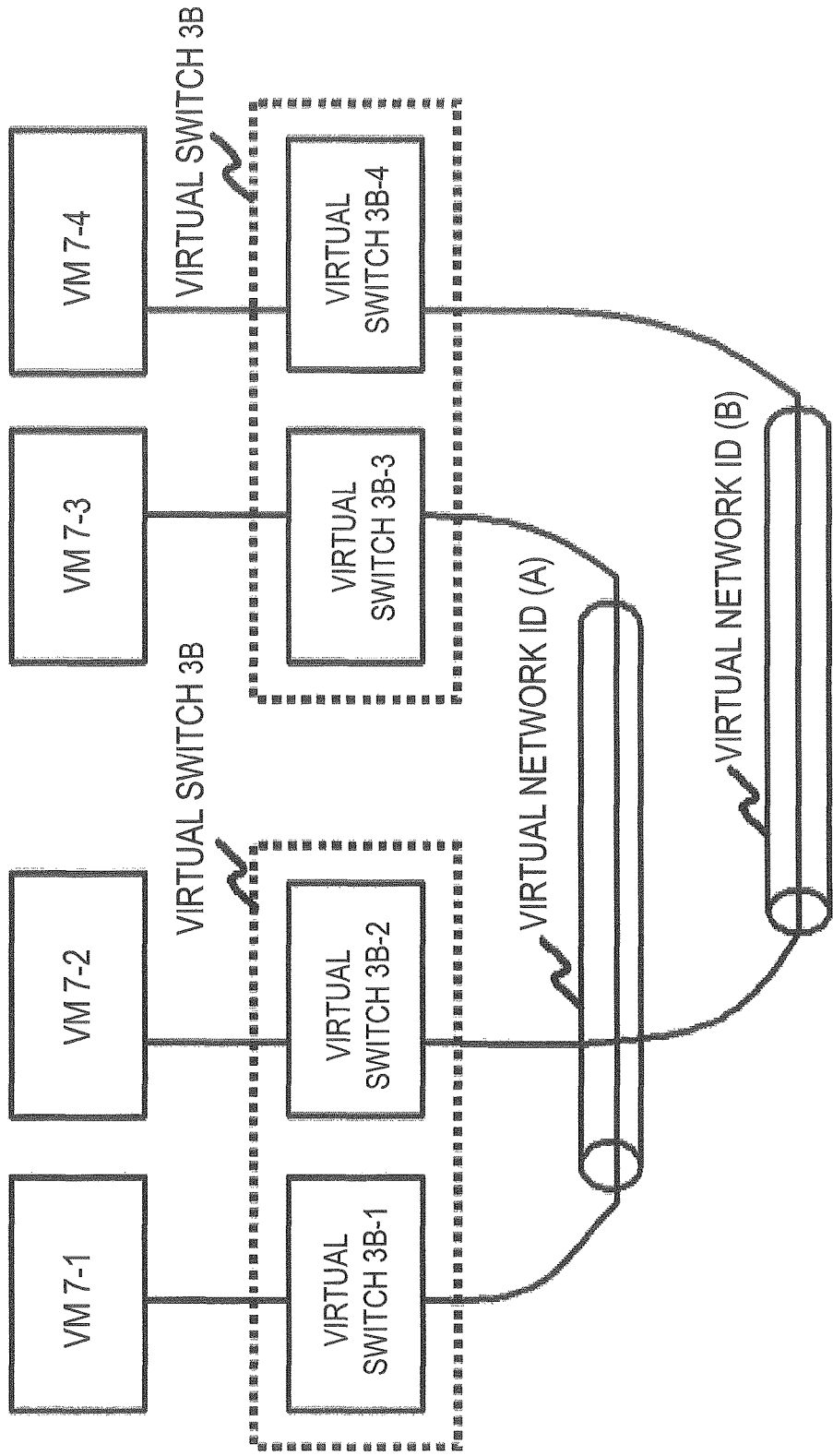
FIG. 19 is a diagram showing an operational example of the fifth exemplary embodiment.

A description is given concerning an example of a communication operation among the virtual machines 7, making reference to FIG. 19.

In a case of communicating with another virtual machine 7, the virtual machine 7 communicates via the virtual network built on the physical switches 6. In the example of FIG. 19, communication between virtual machine 7-1 and virtual machine 7-3 is executed via a tunnel for which a virtual network ID is "A", and communication between virtual machine 7-2 and virtual machine 7-4 is executed via a tunnel for which a virtual network ID is "B".

The control apparatus 1B assigned to the virtual switch 3B-1, for example, gives notification to the virtual switch 3B-1 of a packet handling operation specifying assigning a tag (for example, a VLAN tag) of the virtual network ID "A" to a packet with a destination of the virtual machine 7-3. On receiving the packet with the destination of the virtual machine 7-3 from the virtual machine 7-1, for example, the virtual switch 3B-1 assigns the tag indicating the virtual network ID "A" to the packet, in accordance with an instruction of the control apparatus 1B.

The control apparatus 1B assigned to the virtual switch 3B-2, for example, gives notification to the virtual switch 3B-2 of a packet handling operation specifying assigning a tag (for example, a VLAN tag) of the virtual network ID "B" to a packet with a destination of the virtual machine 7-4. On receiving the packet with the destination of the virtual machine 7-4 from the virtual machine 7-2, for example, the virtual switch 3B-2 assigns the tag indicating the virtual network ID "B" to the packet, in accordance with an instruction of the control apparatus 1B.

The physical switch 6 holds in advance a configuration (for example, a port number with respect to which a packet with the virtual network ID "A" is to be forwarded) of a packet forwarding method based on the virtual network ID tag.

By a configuration in which the control apparatus 1B controls only the virtual switch 3B, as in the fifth exemplary embodiment, it is possible to inhibit load increase on the control apparatus 1B. Furthermore, it is possible to install a network with centralized control by the control apparatuses, without replacing existing facilities (for example, the physical switches 6) of the communication system.

Preferred forms of the present invention will now be summarized as follows.

(Mode 1)

A communication system, comprising:

a plurality of control apparatuses that determine a packet handling operation;

a plurality of packet processing means that process a packet in accordance with the packet handling operation notified by said control apparatus;

assignment means that assigns, with respect to each of the packet processing means concerned, a control apparatus that controls said packet processing means; and a database that is shared by said plurality of control apparatuses and that stores information related to said packet handling operation; wherein each of said control apparatuses refers to said database to determine said packet handling operation.

(Mode 2)

The communication system according to mode 1, wherein each of said control apparatuses retrieves information corresponding to a packet processing means that is a target for control, from said database, and determines said packet handling operation to be transmitted to said packet processing means being the target for control, based on the retrieved information.

(Mode 3)

The communication system according to mode 1 or 2, wherein each of said control apparatuses changes a reference region of said database, in accordance with a packet processing means that is a target for control, being changed.

(Mode 4)

The communication system according to any of modes 1 to 3, wherein said database stores said information by division into regions respectively corresponding to said plurality of packet processing means.

(Mode 5)

The communication system according to any of modes 1 to 4, wherein each of said control apparatuses refers to said database at prescribed periods, and confirms whether or not there is a packet handling operation to be notified to a packet processing means assigned by said assignment means.

(Mode 6)

The communication system according to any of modes 1 to 5, wherein each of said control apparatuses refers to said database in response to receiving notification indicating that content of said database has been changed.

(Mode 7)

The communication system according to any of modes 1 to 6, wherein said assignment means assigns, for each packet processing means, a control apparatus that controls the packet processing means concerned, based on a prescribed rule.

(Mode 8)

The communication system according to any of modes 1 to 7, wherein said assignment means assigns, for each packet processing means, a control apparatus that controls the packet processing means concerned, based on load state of said control apparatus.

(Mode 9)

The communication system according to any of modes 1 to 8, wherein said assignment means assigns, for each packet processing means, a control apparatus that controls the packet processing means concerned, based on information related to a position of said packet processing means concerned.

(Mode 10)

The communication system according to any of modes 1 to 9, wherein said assignment means has a function for changing a control apparatus assigned to respective packet processing means to another control apparatus.

(Mode 11)

The communication system according to any of modes 1 to 10, wherein said assignment means, in a case where a control apparatus has come to stop, determines another control apparatus to control a packet processing means in place of said stopped control apparatus.

(Mode 12)

A control apparatus that controls packet processing, comprising: first means that refers to a database shared by said control apparatus and another control apparatus, and determines a packet handling operation related to a processing method for said packet; and second means that notifies said determined packet handling operation to, among a plurality of packet processing means, a packet processing means assigned to said control apparatus.

(Mode 13)

The control apparatus according to mode 12, wherein said first means retrieves information corresponding to a packet processing means assigned to said control apparatus, from said database, and determines said packet handling operation to be transmitted to the packet processing means concerned, based on the retrieved information.

(Mode 14)

The control apparatus according to mode 12 or 13, wherein said first means changes a reference region of said database, in accordance with a packet processing means that is a target for control, being changed.

(Mode 15)

The control apparatus according to any of modes 12 to 14, wherein said database stores the information by division into regions respectively corresponding to said plurality of packet processing means.

(Mode 16)

The control apparatus according to any of modes 12 to 15, wherein said control apparatus refers to said database at prescribed periods, and confirms whether or not there is a packet handling operation to be notified to a packet processing means assigned by a assignment means.

(Mode 17)

The control apparatus according to any of modes 12 to 16, wherein said control apparatus refers to said database in response to receiving notification indicating that content of said database has been changed.

(Mode 18)

A communication method by which a plurality of control apparatuses control packet processing, comprising:

assigning, to each of a plurality of packet processing means, a control apparatus that controls the packet processing means concerned;

determining, by each of said control apparatuses, a packet handling operation for processing a packet, by referring to a database shared by said plurality of control apparatuses; and notifying, by each of said control apparatuses, said determined packet handling operation to said assigned packet processing means.

(Mode 19)

A control method for a control apparatus that controls processing of a packet, comprising:

determining a packet handling operation related to a method of processing said packet, by referring to a database shared by said control apparatus and another control apparatus; and notifying said determined packet handling operation to, among a plurality of packet processing means, a packet processing means assigned to said control apparatus.

(Mode 20)

A program that executes, in a control apparatus that controls processing of a packet, a process of determining a packet handling operation related to a method of processing said packet, by referring to a database shared by said control apparatus and another control apparatus; and a process of notifying said determined packet handling operation to, among a plurality of packet processing means, a packet processing means assigned to said control apparatus.

The disclosure of the aforementioned Patent Literature and the Non-Patent Literatures is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

REFERENCE SIGNS LIST 1, 1A, 1B control apparatus
10 communication unit
11, 20 control unit
12 assignment management DB 2 assignment unit
21 management DB
3, 3A packet processing unit
3B virtual switch
30 communication unit
31 packet processor
32 packet handling operation DB
4 control information DB
5 server
6 physical switch
7 virtual machine (VM)
600 OpenFlow switch
601 flow table
700 OpenFlow controller
701 secure channel

What is claimed is:

1. A communication system, comprising:
a plurality of control apparatuses configured to determine a packet handling operation;
a plurality of packet processing apparatuses configured to process a packet based on the packet handling operation notified by at least one of the control apparatuses;
an assignment apparatus comprising one or more processors configured to:
determine a control apparatus from the plurality of control apparatuses having a load lower than other of the plurality of the control apparatuses, when a new packet processing apparatus is connected to the assignment apparatus;
assign the new packet processing apparatus to the determined control apparatus for controlling the assigned packet processing apparatus; and
a database that is shared by the plurality of control apparatuses and that stores information related to the packet handling operation, wherein each of the control apparatuses refers to the database to
determine the packet handling operation by referring to the database.

2. The communication system of claim 1, wherein each of the control apparatuses retrieves information corresponding to at least one of the packet processing apparatuses that is a target for control, from the database, and determines the packet handling operation to be transmitted to the at least one of the packet processing apparatuses being the target for control, based on the retrieved information.

3. The communication system of claim 1, wherein each of the control apparatuses changes a reference region of the database, based on at least one of the packet processing apparatuses that is a target for control, being changed.

4. The communication system of claim 1, wherein the database stores the information by division into regions respectively corresponding to the plurality of packet processing apparatuses.

5. The communication system of claim 1, wherein each of the control apparatuses refers to the database at prescribed periods, and confirms whether or not there is a packet handling operation to be notified to the assigned packet processing apparatus.

6. The communication system of claim 1, wherein each of the plurality of control apparatuses refers to the database in response to receiving a notification indicating that content of the database has been changed.

7. The communication system of claim 1, wherein the assignment apparatus is further configured to assign each of the plurality of packet processing apparatuses a control apparatus of the plurality of control apparatuses, wherein the assigned control apparatus controls the packet processing apparatus based on information related to a position of the placket processing apparatuses.

8. The communication system of claim 1, wherein the assignment apparatus is further configured to assign a function for changing at least one of the control apparatuses assigned to respective packet processing apparatuses to at least one of another of the control apparatuses.

9. The communication system of claim 1, wherein the assignment apparatus is further configured to:
determine a control apparatus from the plurality of control apparatuses when the control apparatus is added to the communication system; and
assign at least one of the plurality of packet processing apparatuses the determined control apparatus, wherein the determined control apparatus controls the assigned packet processing apparatus.

10. A first control apparatus that controls packet processing, wherein the first control apparatus is one of a plurality of control apparatuses, the first control apparatus comprising:
one of more processors configured to:
refer to a database shared by the first control apparatus and a second control apparatus of the plurality of control apparatuses;
determine a packet handling operation performed by a plurality of packet processing apparatuses to process a packet;
determine a third control apparatus of the plurality of control apparatuses having a load lower than other of the plurality of the control apparatuses, when a new packet processing apparatus is added to the plurality of packet processing apparatuses;
notify the determined packet handling operation to, among the plurality of packet processing apparatuses, at least one packet processing apparatus assigned to the third control apparatus.

11. The first control apparatus of claim 10, wherein the one of more processors are further configured to:
retrieve information corresponding to at least one of the plurality of packet processing apparatuses assigned to the third control apparatus, from the database; and
determine the packet handling operation to be transmitted to the packet processing apparatus, based on the retrieved information.

12. The first control apparatus of claim 10, wherein the one or more processors are further configured to change a reference region of the database based on the at least one of the plurality of packet processing apparatuses that is the target for control, being changed.

13. The first control apparatus of claim 10, wherein the database stores the information in regions respectively corresponding to at least one of the plurality of packet processing apparatuses.

14. The first control apparatus of claim 10, wherein the one of more processors are further configured to:
refer to the database at prescribed periods; and
confirm whether the packet handling operation is available to be notified to at least one of the plurality of packet processing apparatuses assigned to the third control apparatus.

15. The first control apparatus of claim 10, wherein the one of more processors are further configured to refer to the database in response to receiving a notification indicating that content of the database has been changed.

16. The first control apparatus of claim 10, wherein the third control apparatus is assigned to at least one of the plurality of packet processing apparatuses when the third control apparatus is added to the communication system.

17. A communication method by which a plurality of control apparatuses controls packet processing, comprising:
- determining a control apparatus of the plurality of control apparatuses having a load lower than other of the plurality of the control apparatuses when a new packet processing apparatus is added to a plurality of packet processing apparatuses;
- assigning the new packet processing apparatus to the determined control apparatus for controlling the assigned packet processing apparatus;
- determining, by the determined control apparatus, a packet handling operation for processing a packet, by referring to a database shared by the plurality of control apparatuses;
- notifying, by the determined control apparatus, the determined packet handling operation to the assigned packet processing apparatus.

18. The communication method of claim 17, further comprising:
- determining a control apparatus from the plurality of control apparatuses when the control apparatus is added to the communication system; and
- assigning at least one of the plurality of packet processing apparatuses the determined control apparatus, wherein the determined control apparatus controls the assigned packet processing apparatus.

19. A control method for a first control apparatus that controls processing of a packet, wherein the first contras apparatus is one of a plurality of control apparatuses, the control method comprising:
- determining a packet handling operation performed by a plurality of packet processing apparatuses to process the packet, by referring to a database shared by the first control apparatus and a second control apparatus of the plurality of control apparatuses;
- determining a control apparatus of the plurality of control apparatuses having a load lower than other of the plurality of the control apparatuses, when a new packet processing apparatus is added to the plurality of packet processing apparatuses;
- notifying the determined packet handling operation to, among the plurality of packet processing apparatuses, at least one of the packet processing apparatuses assigned to the control apparatus determined to have the lower load.

20. A non-transitory computer-readable storage medium having stored thereon a computer program, the computer program comprising a set instructions that, when executed by a computer in a first control apparatus of a plurality of control apparatuses, cause the computer to perform a method that controls the processing of a packet, the method comprising:
- determining a packet handling operation performed by a plurality of packet processing apparatuses to process the packet, by referring to a database shared by the first control apparatus and a second control apparatus of the plurality of the control apparatuses;
- determining a control apparatus of the plurality of control apparatuses having a load lower than other of the plurality of the control apparatuses, when a new packet processing apparatus is added to the plurality of packet processing apparatuses;
- notifying the determined packet handling operation to, among the plurality of packet processing apparatuses, at least one of the packet processing apparatuses assigned to the control apparatus determined to have the lower load.

* * * * *